US012134032B2

(12) United States Patent
Xu

(10) Patent No.: US 12,134,032 B2
(45) Date of Patent: Nov. 5, 2024

(54) PLAYER AND PLAY METHOD

(71) Applicant: REALTEK SEMICONDUCTOR CORPORATION, Hsinchu (TW)

(72) Inventor: Xin Xu, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 387 days.

(21) Appl. No.: 17/685,425

(22) Filed: Mar. 3, 2022

(65) Prior Publication Data
US 2022/0401829 A1 Dec. 22, 2022

(30) Foreign Application Priority Data
Jun. 16, 2021 (CN) .......................... 202110665605.2

(51) Int. Cl.
A63F 13/25 (2014.01)
A63F 13/327 (2014.01)
H04W 4/02 (2018.01)
H04W 4/80 (2018.01)

(52) U.S. Cl.
CPC ............ A63F 13/25 (2014.09); A63F 13/327 (2014.09); H04W 4/023 (2013.01); H04W 4/80 (2018.02)

(58) Field of Classification Search
CPC ...... A63F 13/25; A63F 13/327; H04W 4/023; H04W 4/80; H04N 21/41407; H04N 5/57; H04N 5/60; H04N 21/43637; H04N 21/44218
USPC .......................................................... 370/254
See application file for complete search history.

(56) References Cited

U.S. PATENT DOCUMENTS 9,172,898 B2   10/2015 Kim
2013/0024018 A1*  1/2013 Chang ................... H04S 7/302
                                                    700/94
2013/0094666 A1*  4/2013 Haff ................ H04N 21/42222
                                                    345/428
2017/0272166 A1*  9/2017 Albrecht .............. H04B 10/516

FOREIGN PATENT DOCUMENTS

CN          106569772 A       4/2017

OTHER PUBLICATIONS

OA letter of the counterpart TW application (appl. No. 110123180) mailed on Dec. 30, 2021.
Nalydadad, "Introduction to GATT Bluetooth transmission", Jul. 24, 2019, Medium.

(Continued)

Primary Examiner — Mang Hang Yeung
(74) Attorney, Agent, or Firm — WPAT, P.C.

(57) ABSTRACT

A player and a play method are capable of displaying image and/or playing music according to a ranging result. The player has a wireless communication function for establishing a wireless connection with a portable device. The player is configured to obtain a received signal strength index (RSSI) of the portable device according to a wireless signal from the portable device, then calculate an estimation distance between the player and the portable device according to the RSSI to obtain the ranging result, and then determine at least one play parameter such as the brightness or the volume of the player according to the ranging result.

7 Claims, 4 Drawing Sheets

(56) References Cited

OTHER PUBLICATIONS

OA letter of a counterpart CN application (appl. No. 202110665605.2) mailed on Mar. 1, 2024. Summary of the CN OA letter: (1) Claim 1 is rejected under Chinese Patent Act §22-2 as anticipated by D1. (2) Claims 2~10 are rejected under Chinese Patent Act §22-3 as being unpatentable by D1 or over D1 in view of D2.
Introduction to GATT profile (showing how to establish Bluetooth connection under GATT), 2019, (https://www.cnblogs.com/yongdaimi/p/11507397.html).

* cited by examiner

PLAYER AND PLAY METHOD

BACKGROUND OF THE INVENTION

1. Field of the Invention

The present disclosure relates to a player and a play method, especially to a player and a play method capable of displaying image and/or playing music according to a ranging result.

2. Description of Related Art

When a user uses a smart device (e.g., a smart television or a smart speaker), the distance between the user and the smart device may change because the user may walk around or the smart device may be moved. After the distance changed, if the user wants to have better user experience or hopes his previous experience will hold, the user has to use a remote controller or apply a means such as voice recognition to adjust parameters (e.g., brightness and/or volume) of the smart device. However, the user may not have a remote controller in hand or encounter problems such as a low success rate of voice recognition, a slow response to voice control, and an unstable wireless communication environment for voice recognition. All of the above-mentioned problems will lower the user experience.

In addition, the user may forget to turn off the smart device when she/he goes away, and this wall cause the waste of power.

SUMMARY OF THE INVENTION

An object of the present disclosure is to disclose a player and a play method as improvements over the prior art.

An embodiment of the player of the present disclosure is capable of displaying image and/or playing music according to a ranging result. The player includes a wireless communication function for establishing a wireless connection with a portable device. After the establishment of the wireless connection, the player obtains a received signal strength index (RSSI) of the portable device according to a wireless signal from the portable device, calculates an estimation distance between the player and the portable device according to the RSSI and thereby obtains the ranging result, and then determines at least one play parameter (e.g., brightness and/or volume) of the player according to the ranging result.

An embodiment of the play method of the present disclosure is capable of displaying image and/or playing music according to a ranging result. This embodiment is executed by a player including a wireless communication function. The embodiment includes the following steps: establishing a wireless connection with a portable device to receive a wireless signal from the portable device; obtaining an RSSI of the portable device according to the wireless signal; calculating an estimation distance between the player and the portable device according to the RSSI and thereby obtaining the ranging result; and determining at least one play parameter of the player according to the ranging result.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The present specification discloses a player and a play method capable of displaying image and/or playing music according to a ranging result.

Figure 1:
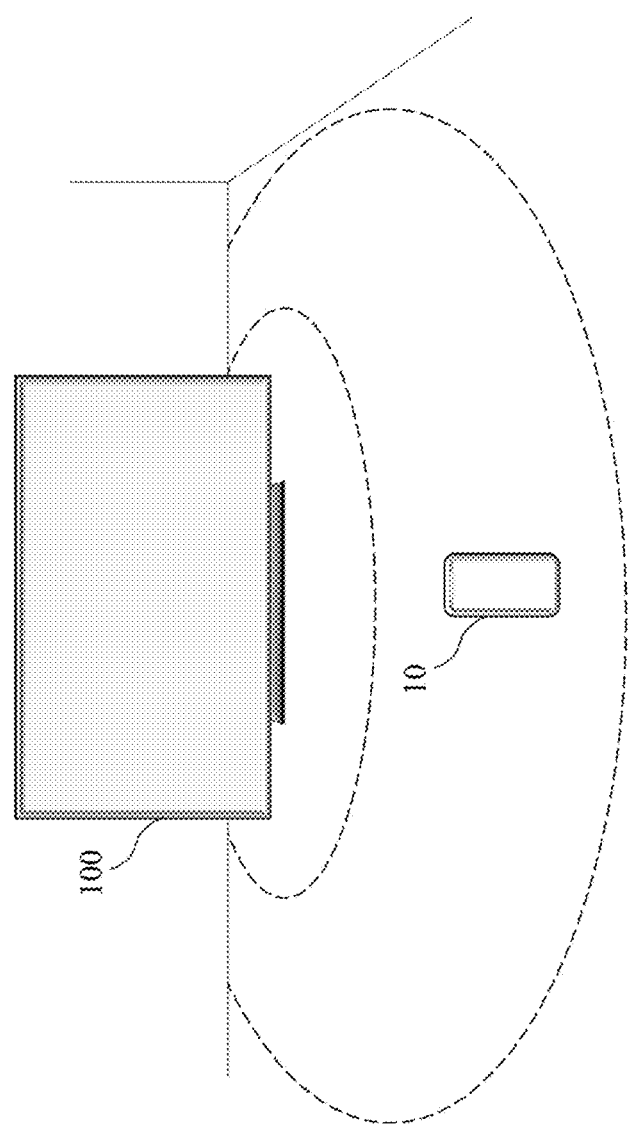
FIG. 1 shows an embodiment of the player of the present disclosure.

FIG. 1 shows an embodiment of the player of the present disclosure. The player 100 of FIG. 1 includes a wireless communication function for establishing a wireless connection with a portable device 10; for example, the player broadcasts an advertising packet to establish the wireless connection with the portable device 10, wherein the advertising packet conforms to Generic Access Profile (GAP). After the establishment of the wireless connection, the player 100 obtains a received signal strength index (RSSI) of the portable device 10 according to a wireless signal from the portable device 10. Next, the player 100 calculates an estimation distance between the player 100 and the portable device 10 according to the RSSI to obtain the ranging result. Afterward, the player 100 determines at least one play parameter of the player 100 according to the ranging result. An example of the at least one play parameter includes at least one of the following: at least one image parameter (e.g., brightness, backlight, contrast, sharpness, tints, tones, shades, and color temperature); and at least one sound parameter (e.g., volume, base, treble, balance, and echo). The at least one play parameter can be a set of parameters that are predetermined or selected by a user.

Please refer to FIG. 1. In an exemplary implementation, the wireless communication function is a Bluetooth Low Energy (BLE) communication function; the player 100 functions as a central device while the portable device 10 functions as a peripheral device; and the player 100 and the portable device 10 transmit packets to each other based on their established wireless connection. The packets conform to Generic Access Profile (GAP), and the wireless connection conforms to Generic Attribute Profile (GATT).

Please refer to FIG. 1. In an exemplary implementation, if the wireless connection between the player 100 and the portable device 10 is established for the first time, the player 100 can display image or play sound to instruct the user of the portable device 10 to change the distance between the player 100 and the portable device 10 and then the player 100 can perform the following operations:

(a) when the user follows the instruction to make the estimation distance be a first distance (e.g., 100 centimeters), the player 100 recording a reference strength of the wireless signal;

(b) when the user moves the portable device 10 to make the estimation distance be a second distance (e.g., 50 centimeters), the player 100 calculating an environmental attenuation factor (EAF) according to the RSSI and the reference strength, wherein the first distance can be determined by default setting or the user and is different from the second distance; and (c) after the reference strength and the EAF are obtained, when the estimation distance (e.g., 200 centimeters) changes and is different from any of the first distance and the second distance, the player 100 calculating the estimation distance according to the RSSI, the reference strength, and the EAF.

The calculation of a wireless signal strength and the calculation of an RSSI are well known in this technical field, and the detail of the calculation is omitted here. The calculation of the EAF can be realized with the following equation (1):

$$d = 10^{\frac{|RSSI|-A}{10 \times n}} \qquad (1)$$

In the equation (1), "d" denotes the distance between the player 100 and the portable device 10, "A" denotes the reference strength, and "n" denotes the EAF.

Please refer to FIG. 1. In an exemplary implementation, the player 100 calculates the estimation distance periodically (e.g., every 0.5 seconds) or non-periodically (e.g., according to the trigger of any user command), and then stores data of the estimation distance. When the estimation distance (i.e., the latest data of the estimation distance here) falls within a first range (e.g., 0~70 centimeters as illustrated with the dotted small circular arc of FIG. 1), the player 100 applies first setting (e.g., television eyecare mode and/or speaker volume down setting) to determine the at least one play parameter (e.g., brightness and/or volume). When the estimation distance falls within a second range (e.g., 71~500 centimeter as illustrated with the dotted large circular arc of FIG. 1), the player 100 applies second setting to determine the at least one play parameter (e.g., television default mode and/or speaker volume initial setting). Normally, the first setting is different from the second setting. The determination of the parameter (i.e., the adjustment of the parameter) can be realized with the following equation (2):

$$V_d = \frac{d}{D} V_0 \qquad (2)$$

In equation (2), "$V_d$" denotes the adjusted parameter (e.g., the adjusted volume), "d" denotes the distance between the player 100 and the portable device 10, "D" denotes a predetermined distance (e.g., the upper limit of the aforementioned first range), and "$V_0$" denotes an initial parameter (e.g., the initial volume) correlated with the predetermined distance "D". Those having ordinary skill in the art can determine other kinds of ranges of distance and their corresponding setting according to the present disclosure and demands for implementation.

Please refer to FIG. 1. In an exemplary implementation, when the estimation distance is longer than a maximum distance (e.g., 500 centimeters), the player 100 stops referring to the estimation distance to determine the at least one play parameter; in this case, the variation of the estimation distance is meaningless to the player 100 for determining the at least one play parameter. In another exemplary implementation, the player 100 can wirelessly connect to one of candidate portable devices (not shown) including the portable device 10; when the estimation distance between the player 100 and its connected candidate portable device is longer than the maximum distance:

(a) the player 100 ascertains whether a distance between any of the other candidate portable device(s) and the player 100 shorter than the maximum distance exists through the aforementioned GAP;

(b) based on (a), if the player 100 finds that a distance between one of the other candidate portable device(s) and the player 100 is shorter than the maximum distance, the player 100 establishes a wireless connection with this candidate portable device through the aforementioned GATT, and then refers to the distance between this candidate portable device and the player 100 to determine the at least one play parameter; and (c) based on (a), if the player 100 finds that the distance between each of the candidate portable devices and the player 100 is longer than the maximum distance, the player 100 may enter a sleep mode, be turned off after the player 100 enters the sleep mode for a predetermined time, or be turned off directly.

Please refer to FIG. 1. In an exemplary implementation, the player 100 calculates the estimation distance at different time points to generate and store multiple records (e.g., 10 records) of the estimation distance, and then calculates and stores a standard deviation of the multiple records of the estimation distance; and in this way, the player 100 can obtain multiple standard deviations that are related to multiple candidate portable devices respectively. When the standard deviation in regard to the portable device 10 is the maximum one among the multiple standard deviations, the player 100 treats the portable device 10 as an active device and determines the at least one play parameter of the player 100 according to the ranging result. In the above implementation, each of the multiple standard deviations is a standard deviation of multiple records of a distance between the player 100 and one of the candidate portable devices; more specifically, the player 100 can wirelessly connect to these candidate portable devices one by one, and obtain the multiple records of the distance between the player 100 and each candidate portable device to calculate the standard deviation of the multiple records, and then choose one of the candidate portable devices as the active device (e.g., the portable device 10 in FIG. 1) according to the standard deviations of the candidate portable devices. The above-mentioned standard deviation can be calculated with the following equation (3):

$$\Sigma_{i=0}^{N}(d_{i+}-d_i)^2 \qquad (3)$$

Figure 2:
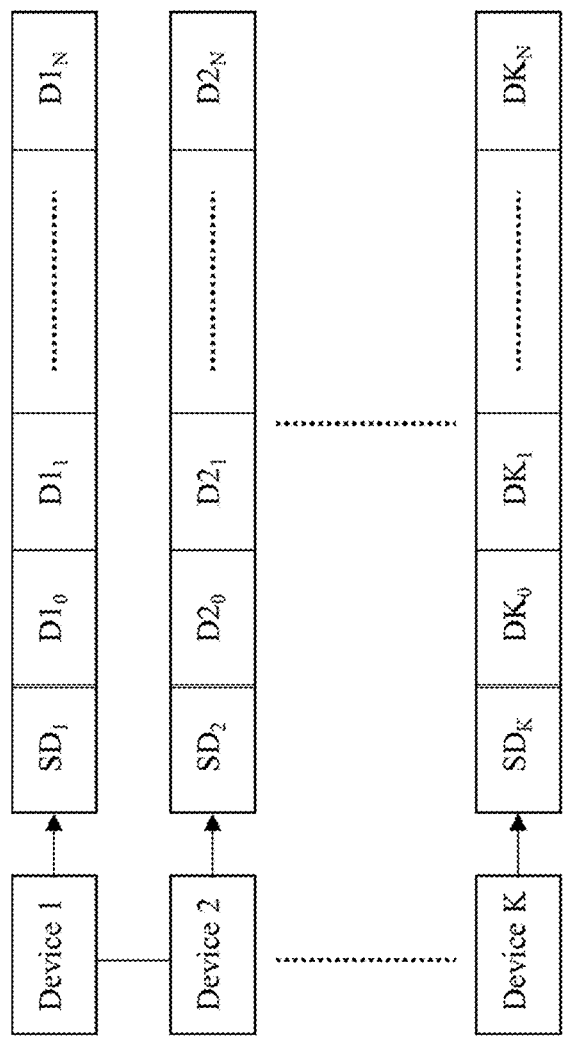
FIG. 2 shows a list stored in the player of FIG. 1 including the records of distance and the standard deviation of the records with respect to each portable device.

In the equation (3), "N" denotes the number of the multiple records (e.g., 10 records when N=9) of each candidate portable device. It should be noted that the player 100 can store the records and deviations of the candidate portable devices in a list. An embodiment of the list is shown in FIG. 2, wherein "Device 1", "Device 2", . . . , and "Device K" denote the indices of the candidate portable devices respectively; "$SD_1$", "$SD_2$", . . . , "$SD_K$" denote the standard deviations in regard to "Device 1", "Device 2", . . . , and "Device K" respectively; "$D1_0$", "$D1_1$", . . . , "$D1_N$" denote (N+1) records of "Device 1"; "$D2_0$", "$D2_1$", . . . , "$D2_N$" denote (N+1) records of "Device 2"; and "$DK_0$", "$DK_1$", . . . , "$DK_N$" denote (N+1) records of "Device K".

Figure 3:
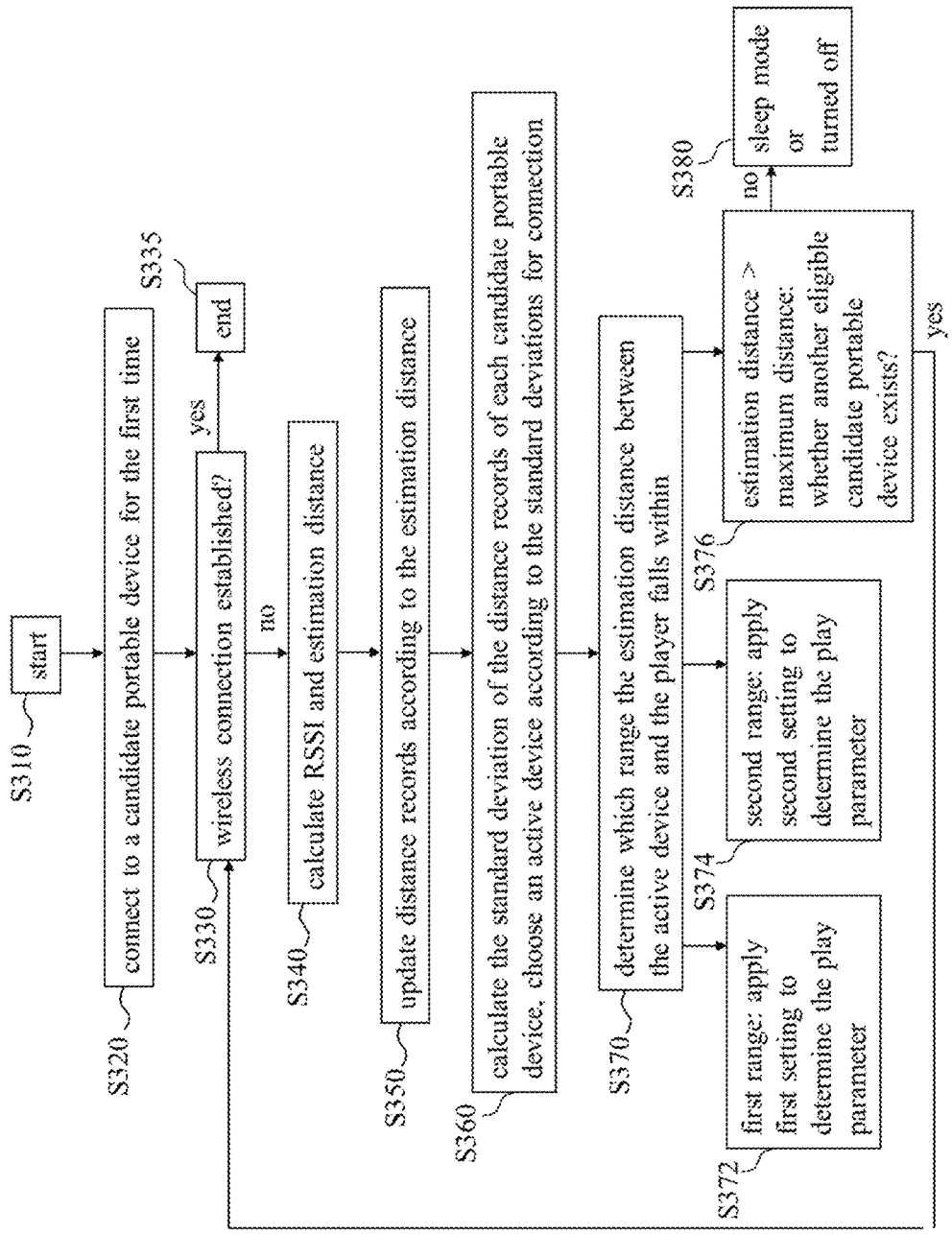
FIG. 3 shows a flow chart of an embodiment of the operations executed by the player of FIG. 1.

FIG. 3 shows a flow chart of an embodiment of the operations executed by the player 100 of FIG. 1. FIG. 3 includes the following steps:

S310: Start the flow.

S320: Wirelessly connect to a candidate portable device for the first time. In this step, the player 100 wirelessly connects to a candidate portable device for the first time, and calculates the signal strength (e.g., the aforementioned reference strength) of the candidate portable device and an environmental attenuation factor (EAF).

S330: Determine whether a wireless connection between the player 100 and a device is established; if so, go to S335; if not, go to S340.

S335: End the flow.

S340: Calculate the RSSI and estimation distance of a connected device. The connected device could be an only candidate portable device, or one of multiple candidate portable devices.

S350: Update the distance records of the connected device according to the estimation distance mentioned in S340.

S360: Calculate the standard deviation of the distance records of each candidate portable device, choose an active device from the only candidate portable device or the multiple candidate portable devices, and then connect to the active device.

S370: Determine which range an estimation distance between the active device and the player 100 falls within, and thereby obtain a ranging result.

S372: When the estimation distance falls within a first range, apply first setting (e.g., TV eyecare setting and/or speaker volume down setting) to determine the at least one play parameter (e.g., brightness parameter and/or volume parameter) of the player 100.

S374: When the estimation distance falls within a second range, apply second setting (e.g., TV default setting and/or speaker volume initial setting) to determine the at least one play parameter (e.g., brightness parameter and/or volume parameter) of the player 100.

S376: When the estimation distance is longer than a maximum distance, determine whether a distance between any of the other candidate portable device(s) and the player 100 that is shorter than the maximum distance exists; if so, go to S330; if not, go to S380. It should be noted that in this step each of the other candidate portable device(s) (e.g., at least one of "Device 1", "Device 2", . . . , "Device K" in FIG. 2) had connected to the player 100 before.

S380: Enter a sleep mode or be turned off.

Since those having ordinary skill in the art can refer to the description of the preceding paragraphs to appreciate the detail and modification of the embodiment of FIG. 3, repeated and redundant description is omitted here.

Figure 4:
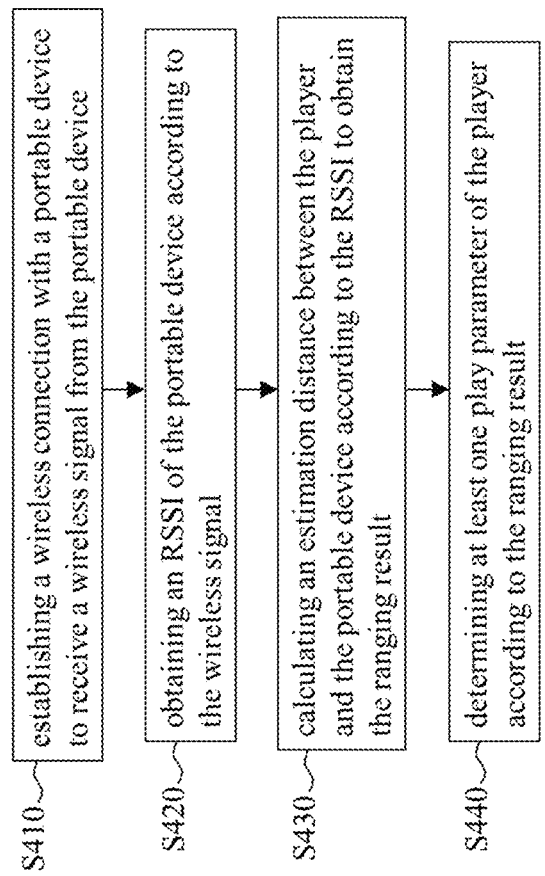
FIG. 4 shows an embodiment of the play method of the present disclosure.

FIG. 4 shows an embodiment of the play method of the present disclosure. This embodiment is executed by a player (e.g., the player 100 of FIG. 1) and capable of displaying image and/or playing music according to a ranging result, wherein the player includes a wireless communication function. The embodiment of FIG. 4 includes the following steps:

S410: establishing a wireless connection with a portable device to receive a wireless signal from the portable device;

S420: obtaining an RSSI of the portable device according to the wireless signal;

S430: calculating an estimation distance between the player and the portable device according to the RSSI to obtain the ranging result; and S440: determining at least one play parameter of the player according to the ranging result.

Since those of ordinary skill in the art can refer to the disclosure of the embodiments of FIGS. 1-3 to appreciate the detail and modification of the embodiment of FIG. 4, which means that some or all of the features of the embodiments of FIGS. 1-3 can be applied to the embodiment of FIG. 4 in a logical way, repeated and redundant description is omitted here.

It should be noted that people of ordinary skill in the art can selectively use some or all of the features of any embodiment in this specification or selectively use some or all of the features of multiple embodiments in this specification to implement the present invention as long as such implementation is practicable; in other words, the present invention can be carried out flexibly in accordance with the present disclosure.

To sum up, the player and play method of the present disclosure can display image and/or play music according to a ranging result and thereby prevent the problems of the prior art.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A play method capable of displaying image and/or playing music according to a ranging result, wherein the play method is executed with a player including a wireless communication function, and comprises:
    establishing a wireless connection with a portable device to receive a wireless signal from the portable device;
    obtaining a received signal strength index (RSSI) of the portable device according to the wireless signal;
    calculating an estimation distance between the player and the portable device according to the RSSI to obtain the ranging result, wherein the play method further comprises:
        responsive to determining that the estimation distance is a first distance, recording a reference strength of the wireless signal;
        responsive to determining that the estimation distance is a second distance, calculating an environmental attenuation factor (EAF) according to the RSSI and the reference strength, wherein the first distance is different from the second distance; and
        responsive to determining that the estimation distance is different from any of the first distance and the second distance, calculating the estimation distance according to the RSSI, the reference strength, and the EAF; and
    determining at least one play parameter of the player according to the ranging result.

2. The play method of claim 1, wherein the player is a television, and the at least one play parameter of the player includes at least one of the following: an image parameter; and a sound parameter.

3. The play method of claim 1, wherein the wireless communication function is a Bluetooth Low Energy (BLE) communication function, and the play method further comprises:
    broadcasting an advertising packet to establish the wireless connection with the portable device,
    wherein: the advertising packet conforms to Generic Access Profile (GAP); the wireless connection conforms to Generic Attribute Profile (GATT); and responsive to determining that the player wirelessly connects to the portable device, the player is not allowed to wirelessly connect to other devices under the GATT.

4. The play method of claim 1, further comprising: calculating the estimation distance periodically or non-periodically, and then storing data of the estimation distance.

5. A play method capable of displaying image and/or playing music according to a ranging result, wherein the play method is executed with a player including a wireless communication function and comprises:

establishing a wireless connection with a portable device to receive a wireless signal from the portable device;
obtaining a received signal strength index (RSSI) of the portable device according to the wireless signal;
calculating an estimation distance between the player and the portable device according to the RSSI to obtain the ranging result; and
determining at least one play parameter of the player according to the ranging result,
wherein the play method further comprises:
calculating the estimation distance at different time points to store multiple records of the estimation distance;
calculating a standard deviation of the multiple records of the estimation distance; and
responsive to determining that the standard deviation is a maximum one among multiple standard deviations that are related to multiple candidate portable devices respectively, treating the portable device as an active device and determines the at least one play parameter of the player according to the ranging result,
wherein the portable device is one of the multiple candidate portable devices, and each of the multiple standard deviations is a standard deviation of multiple records of a distance between the player and one of the multiple candidate portable device.

6. A play method capable of displaying image and/or playing music according to a ranging result, wherein the play method is executed with a player including a wireless communication function and comprises:
establishing a wireless connection with a portable device to receive a wireless signal from the portable device;
obtaining a received signal strength index (RSSI) of the portable device according to the wireless signal;
calculating an estimation distance between the player and the portable device according to the RSSI to obtain the ranging result; and
determining at least one play parameter of the player according to the ranging result, wherein determining the at least one play parameter according to the ranging result includes:
responsive to determining that the estimation distance falls within a first range, applying first setting to determine the at least one play parameter; and
responsive to determining that the estimation distance falls within a second range, applying second setting to determine the at least one play parameter, wherein the first setting is different from the second setting,
wherein the play method further comprises:
responsive to determining that the estimation distance is longer than a maximum distance, stopping referring to the estimation distance to determine the at least one play parameter;
responsive to determining that the estimation distance is longer than the maximum distance, determining whether a distance between any candidate portable device and the player is not longer than the maximum distance; and
responsive to determining that a distance between a candidate portable device and the player is shorter than the maximum distance, referring to the distance between the candidate portable device and the player to determine the at least one play parameter.

7. The play method of claim 6, further comprising: after the estimation distance is longer than the maximum distance, requesting the player to enter a sleep mode or turning off the player.

* * * * *